United States Patent
Kanekawa

(10) Patent No.: US 11,609,999 B2
(45) Date of Patent: Mar. 21, 2023

(54) CONTROL SYSTEM

(71) Applicant: Hitachi, Ltd., Tokyo (JP)

(72) Inventor: Nobuyasu Kanekawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 16/768,729

(22) PCT Filed: Dec. 4, 2018

(86) PCT No.: PCT/JP2018/044484
§ 371 (c)(1),
(2) Date: Jun. 1, 2020

(87) PCT Pub. No.: WO2019/124044
PCT Pub. Date: Jun. 27, 2019

(65) Prior Publication Data
US 2021/0173936 A1    Jun. 10, 2021

(30) Foreign Application Priority Data

Dec. 19, 2017 (JP) .............................. JP2017-242901

(51) Int. Cl.
*G06F 21/57* (2013.01)
*G05B 13/02* (2006.01)
(Continued)

(52) U.S. Cl.
CPC ......... *G06F 21/577* (2013.01); *B60W 60/007* (2020.02); *G05B 13/0265* (2013.01);
(Continued)

(58) Field of Classification Search
None
See application file for complete search history.

(56) References Cited

U.S. PATENT DOCUMENTS

| 2006/0218635 | A1 | 9/2006 | Kramer |
| 2010/0010699 | A1 | 1/2010 | Taguchi |
| 2013/0282336 | A1 | 10/2013 | Maeda |

FOREIGN PATENT DOCUMENTS

| JP | H09-66832 A | 3/1997 |
| JP | H10-40091 A | 2/1998 |

(Continued)

OTHER PUBLICATIONS

Barry, et al., "Safety Verification of Reactive Controllers for UAV Flight in Cluttered Environments using Barrier Certificates", May 14-18, 2012, IEEE, pp. 484-490. (Year: 2012).*

(Continued)

*Primary Examiner* — Qing Yuan Wu
(74) *Attorney, Agent, or Firm* — Foley & Lardner LLP

(57) ABSTRACT

The present invention is capable of realizing normal control of a control device and safe operation of a control target. In the present invention, an automatic control unit 10 generates a control output that is output to a control target in response to an input 1. A safety verification control unit 20 is configured to verify safety of the control output at a plurality of verification levels, and controls the control output on the basis of the verification result. A verification level selection unit manages the state related to the normality of the automatic control unit 10, and selects the verification level of the safety of the control output in the safety verification control unit 20 in accordance with the state.

12 Claims, 9 Drawing Sheets

(51) Int. Cl.
  *G05B 23/02* (2006.01)
  *B60W 60/00* (2020.01)
  *G05B 9/03* (2006.01)
  *B60W 30/08* (2012.01)
  *G05B 13/00* (2006.01)
  *G05B 9/00* (2006.01)
  *G06F 21/00* (2013.01)
  *G06F 11/07* (2006.01)
  *G06F 11/36* (2006.01)
  *G07C 5/08* (2006.01)

(52) U.S. Cl.
  CPC ......... *G05B 23/0205* (2013.01); *B60W 30/08* (2013.01); *B60W 60/00* (2020.02); *B60W 60/0015* (2020.02); *B60W 60/00188* (2020.02); *G05B 9/00* (2013.01); *G05B 9/03* (2013.01); *G05B 13/00* (2013.01); *G05B 23/02* (2013.01); *G06F 11/07* (2013.01); *G06F 11/36* (2013.01); *G06F 21/00* (2013.01); *G06F 2221/034* (2013.01); *G07C 5/0808* (2013.01)

(56) References Cited

FOREIGN PATENT DOCUMENTS

| | | |
|---|---|---|
| JP | 2008-117082 A | 5/2008 |
| JP | 2008-535053 A | 8/2008 |
| JP | 2014-211473 A | 11/2014 |
| JP | 2017-091234 A | 5/2017 |
| WO | WO-2012/090624 A1 | 7/2012 |

OTHER PUBLICATIONS

Kanekawa, "About safer application to control of artificial intelligence", Lecture proceedings of FIT 2017 (The 16th Forum on Information Technology), 2017, first vol. pp. 67-72.

Hirotsu, "Technology for improving safety of automatic driving in which artificial intelligence is applied", Electronics lecture proceedings 2 of the IEICE General Conference 2018, pp. SS-64-SS-65.

International Search Report with English translation and Written Opinion issued in corresponding application No. PCT/JP2018/044484 dated Mar. 12, 2019.

\* cited by examiner

FIG. 15

| Case | OVERRIDE OPERATION AMOUNT INFORMATION 12 PRIORITY INFORMATION 13 | OVERRIDE OPERATION AMOUNT INFORMATION 12 SAFETY VERIFICATION RESULT | AUTOMATIC CONTROL OUTPUT 2-1 SAFETY VERIFICATION RESULT | AUTOMATIC CONTROL OUTPUT 2-2 SAFETY VERIFICATION RESULT | ... | AUTOMATIC CONTROL OUTPUT 2-n SAFETY VERIFICATION RESULT | CONTROL OUTPUT (4) |
|---|---|---|---|---|---|---|---|
| 1 | 0 | * | OK | * | ... | * | AUTOMATIC CONTROL OUTPUT 2-1 |
| 2 | 0 | * | NG | OK | ... | * | AUTOMATIC CONTROL OUTPUT 2-2 |
| : | : | : | : | : | : | : | : |
| 3 | 0 | * | NG | NG | ... | OK | AUTOMATIC CONTROL OUTPUT 2-n |
| 4 | 0 | * | OK w/limit | OK w/limit | ... | OK w/limit | AUTOMATIC CONTROL OUTPUT 2-1 OUTPUT LIMIT |
| 5 | 0 | * | OK w/limit | NG | ... | NG | AUTOMATIC CONTROL OUTPUT 2-1 OUTPUT LIMIT |
| 6 | 0 | * | NG | OK w/limit | ... | OK w/limit | AUTOMATIC CONTROL OUTPUT 2-2 OUTPUT LIMIT |
| 7 | 0 | * | NG | OK w/limit | ... | NG | AUTOMATIC CONTROL OUTPUT 2-2 OUTPUT LIMIT |
| : | : | : | : | : | : | : | : |
| 8 | 0 | * | NG | NG | ... | OK w/limit | AUTOMATIC CONTROL OUTPUT 2-n OUTPUT LIMIT |
| 9 | 0 | * | NG | NG | ... | NG | OUTPUT STOP |
| 10 | 1 | OK | * | * | ... | * | OPERATION AMOUNT INFORMATION 12 |
| 11 | 1 | OK w/limit | * | * | ... | * | OPERATION AMOUNT INFORMATION 12 OUTPUT LIMIT |
| 12 | 2 | * | * | * | ... | * | OPERATION AMOUNT INFORMATION 12 |

FIG. 16

| Case | OVERRIDE OPERATION AMOUNT INFORMATION 12 PRIORITY INFORMATION 13 | OVERRIDE OPERATION AMOUNT INFORMATION 12 SAFETY VERIFICATION | AUTOMATIC CONTROL OUTPUT 2-1 SAFETY VERIFICATION RESULT | AUTOMATIC CONTROL OUTPUT 2-2 SAFETY VERIFICATION RESULT | ... | AUTOMATIC CONTROL OUTPUT 2-n SAFETY VERIFICATION RESULT | CONTROL OUTPUT (4) | |
|---|---|---|---|---|---|---|---|---|
| 1 | 0 | * | OK | * | ... | * | AUTOMATIC CONTROL OUTPUT 2-1 | |
| 2 | 0 | * | NG | OK | ... | * | AUTOMATIC CONTROL OUTPUT 2-2 | |
| : | : | : | : | : | : | : | : | |
| 3 | 0 | * | NG | NG | ... | OK | AUTOMATIC CONTROL OUTPUT 2-n | |
| 4 | 0 | * | OK w/limit | OK w/limit | ... | OK w/limit | OUTPUT STOP | |
| 5 | 0 | * | OK w/limit | NG | ... | NG | OUTPUT STOP | |
| 6 | 0 | * | NG | OK w/limit | ... | OK w/limit | OUTPUT STOP | SAFETY VERIFICATION ENHANCEMENT |
| 7 | 0 | * | NG | OK w/limit | ... | NG | OUTPUT STOP | |
| : | : | : | : | : | : | : | : | |
| 8 | 0 | * | NG | NG | ... | OK w/limit | OUTPUT STOP | |
| 9 | 0 | * | NG | NG | ... | NG | OUTPUT STOP | |
| 10 | 1 | OK | * | * | ... | * | OPERATION AMOUNT INFORMATION 12 | |
| 11 | 1 | OK w/limit | * | * | ... | * | OPERATION AMOUNT INFORMATION 12 OUTPUT LIMIT | |
| 12 | 2 | * | * | * | ... | * | OPERATION AMOUNT INFORMATION 12 | |

CONTROL SYSTEM

TECHNICAL FIELD

The present invention relates to a control system in which a control device gives a control output to a control target, and more particularly to a control system in consideration of safety.

BACKGROUND ART

Automation of control including automatic driving of an automobile can reduce accidents caused by human error by reducing human operations, and can improve safety. An attempt has been made to introduce artificial intelligence into a control device in order to realize more advanced control. Advanced automatic control as represented by artificial intelligence has the potential to realize advanced control equal to or greater than that of humans.

When advanced control as represented by artificial intelligence is introduced into the field where there is a possibility of an accident such as an automobile as a control target, it is important to ensure the safety of the control target.

PTL 1 discloses that "A traveling control plan evaluation device which can accurately evaluate the safety of the traveling control plan of an automatically operated vehicle is provided. The traveling control plan evaluation device 10 for evaluating the safety of the traveling control plan of the automatically operated vehicle includes: a behavior prediction means 16a for predicting a behavior which is likely to be exhibited by a nearby vehicle which is present near the automatically operated vehicle at a given time point; a location prediction means 16b for predicting the location of the nearby vehicle after the given time point based on the location of the nearby vehicle at the given time point time and the behavior predicted by the behavior prediction means 16a; and an evaluation means 20 for evaluating the safety of the traveling control plan based on the location of the nearby vehicle predicated by the location prediction means 16b and the location that is reached by the automatically operated vehicle according to the traveling control plan."

CITATION LIST

Patent Literature

PTL 1: JP 2008-117082 A

SUMMARY OF INVENTION

Technical Problem

Control output by artificial intelligence may be difficult to predict because it is a result of machine learning. The problem is how to ensure the safe operation of the control target when the prediction of the control output is difficult. Furthermore, if the control device is connected to a communication network in order to give input to the control device, it is also a problem to maintain normal control of the control device including preventing a cyber attack such as viruses and hacking and malfunctions of the control device due to software or hardware bugs.

From the viewpoint of ensuring the security of the control system, if a vulnerability is found in the control device, it is preferable to quickly upgrade the software program using a security patch or the like in order to eliminate the vulnerability. However, when upgrading the software program, it is necessary to verify that the control device appropriately performs the control of the control target after the upgrade.

An object of the present invention is to provide a technique that is capable of realizing normal control of a control device and safe operation of a control target.

Solution to Problem

A control system according to an aspect of the present invention includes: an automatic control unit that generates a control output that is output to a control target in response to a predetermined input; a safety verification control unit configured to verify the safety of the control output at a plurality of verification levels; and a verification level selection unit that manages a state related to the normality of the automatic control unit and selects a verification level of the safety of the control output in the safety verification control unit in accordance with the state.

Advantageous Effects of Invention

According to an aspect of the present invention, it is possible to realize normal control of the control device and safe operation of the control target.

BRIEF DESCRIPTION OF DRAWINGS

FIG. 15 is a view presenting an example of an output selection method of a control output when the control system illustrated in FIG. 14 is in a safety verification enhancement relaxation state S0.

FIG. 16 is a view presenting an example of an output selection method of a control output when the control system illustrated in FIG. 14 is in a safety verification enhancement state S1 or a safety verification enhancement continuation state S2.

DESCRIPTION OF EMBODIMENTS

Embodiments will be described below with reference to the drawings.

First Embodiment

Figure 1:
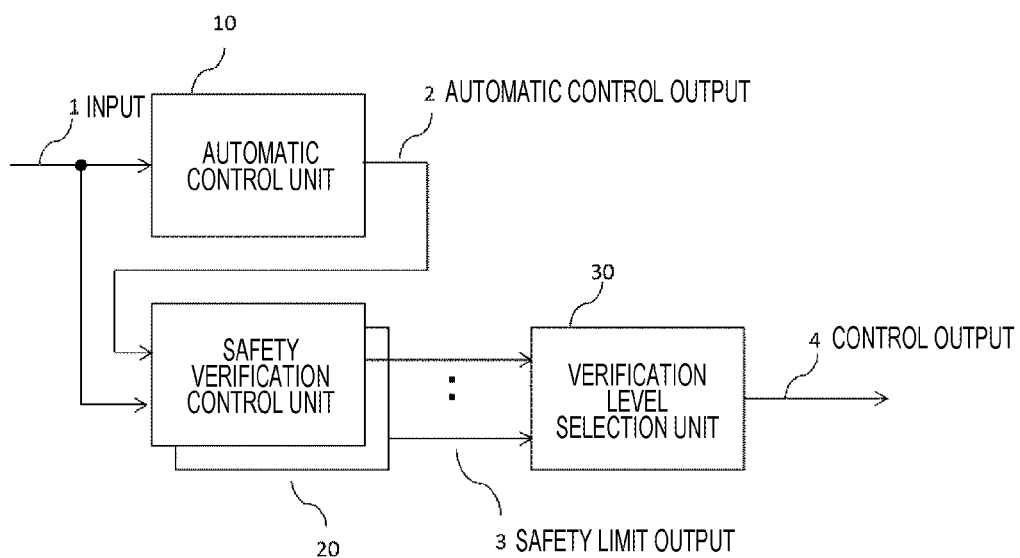
FIG. 1 is a block diagram illustrating an embodiment of a configuration of a control system.

FIG. 1 is a block diagram of the control system according to the first embodiment.

As illustrated in FIG. 1, the control system according to the present embodiment has an automatic control unit 10, a safety verification control unit 20, and a verification level selection unit 30.

In response to a predetermined input 1, the automatic control unit 10 generates a control output 4 that is output to a control target.

The safety verification control unit 20 is configured to verify the safety of the control output 4 at a plurality of verification levels.

The verification level selection unit 30 manages a state related to the normality of the automatic control unit 10, and selects a safety verification level in the safety verification control unit 20 in accordance with the state.

In the control system configured as described above, when a vulnerability of the automatic control unit 10 is detected or when a security patch is implemented, the safety verification in the safety verification control unit is enhanced more than usual. This can increase the probability of successful detection of an abnormal operation due to a cyber attack by enhancing the safety verification before the security patch is implemented, and can increase the probability of successful detection of an abnormal operation due to a bug in the security patch by enhancing the safety verification after the security patch is implemented. After that, when the verification of the security patch is completed, the enhancement of the safety verification is released, and the normal safety verification is restored. This can reduce the probability of a false-positive (false detection of something normal as abnormal) in safety verification.

In addition, in a case where a verification method in the safety verification control unit 20 is being learned as an experience-based safety verification function during operation, the learning of the experience-based safety verification function is stopped when a vulnerability is detected or a security patch is implemented, and thereafter, the learning of the experience-based safety verification function is resumed when the verification of the security patch is completed. Due to this, erroneous learning by the cyber attack can be prevented, and, after the security patch is implemented, erroneous learning by the bug of the security patch can be prevented.

The safety verification control unit 20 is configured to output the control output controlled on the basis of a verification result of each of the plurality of verification levels. The verification level selection unit 30 selects any of the control outputs to be output from the safety verification control unit 20 and outputs the control output to the control target in accordance with the state related to the normality of the automatic control unit 10. Thus, it is possible to output, to the control target, the control output verified at an appropriately selected safety verification level and controlled on the basis of the verification result.

Figure 2:
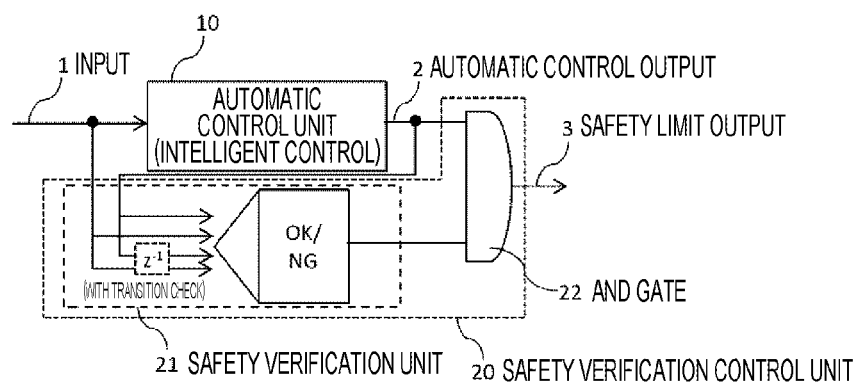
FIG. 2 is a block diagram illustrating a first embodiment of an automatic control unit and a safety verification control unit illustrated in FIG. 1.

FIG. 2 is a block diagram illustrating the first embodiment of the automatic control unit 10 and the safety verification control unit 20 illustrated in FIG. 1.

As illustrated in FIG. 2, the automatic control unit in the present embodiment generates and outputs an automatic control output 2 in response to the predetermined input 1.

As illustrated in FIG. 2, the safety verification control unit 20 in the present embodiment includes a safety verification unit 21 and an AND gate 22. The safety verification unit 21 receives the input 1 to the automatic control unit 10 and the automatic control output 2 having been output from the automatic control unit 10, verifies the safety of the control output 4 on the basis of the input 1 and the automatic control output 2, and outputs a verification result (OK/NG). In the case where the state transition from the past value is also focused (with transition checked), the safety verification unit 21 also receives the input 1 and the automatic control output 2 of the past before one sample ($z^{-1}$), and outputs the verification result (OK/NG) corresponding thereto.

In the automatic control unit 10 and the safety verification control unit 20 configured as described above, when the input 1 is input to the automatic control unit 10, the automatic control unit 10 generates the automatic control output 2 serving as the control output 4 that is output to the control target, and the automatic control output 2 is input to the safety verification unit 21 and the AND gate 22 of the safety verification control unit 20. Then, in the safety verification unit 21, the safety of the control output 4 is verified on the basis of the input 1 to the automatic control unit 10 and the automatic control output 2 having been output from the automatic control unit 10, and its verification result (OK/NG) is output and input to the AND gate 22. Then, in the AND gate 22, if the verification result is OK, which means the verification result is good, the automatic control output 2 is output as a safety limit output 3 on an assumption that the safety of the automatic control output 2 has been confirmed, and if the verification result is NG, which means the verification result is poor, the automatic control output 2 is not output on an assumption that there is a problem in the safety of the automatic control output 2.

Figure 3:
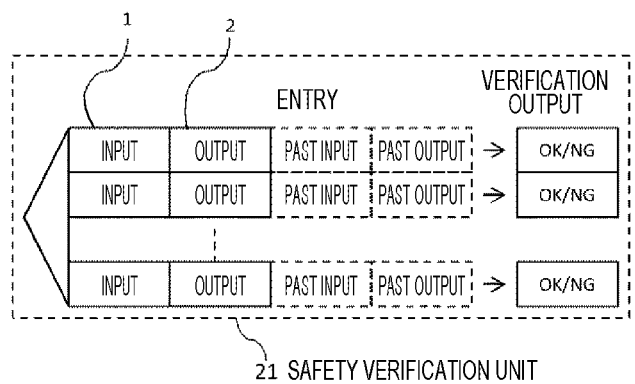
FIG. 3 is a diagram illustrating a configuration example of a memory equivalent to an operation of the safety verification unit illustrated in FIG. 2.

FIG. 3 is a diagram illustrating a configuration example of a memory equivalent to an operation of the safety verification unit 21 illustrated in FIG. 2.

As illustrated in FIG. 3, the operation of the safety verification unit 21 illustrated in FIG. 2 is equivalent to a content addressable memory (CAM), and the verification output (OK/NG) corresponding to the input 1 and the automatic control output 2 and, in the case of being with the transition check, the combination of the past input 1 and the automatic control output 2 is output as an entry.

In the present embodiment, the safety verification control unit 20 can prevent a dangerous output from the automatic control unit 10, thereby allowing the safety of the operation to be improved. Although it is expected to realize control performance beyond human knowledge by introducing artificial intelligence such as deep learning and machine learning into the automatic control unit 10, it is desirable to improve accountability for safety because it is beyond human knowledge. Therefore, by adding the safety verification control unit 20 as in the present embodiment, it is possible to safely realize advanced control beyond human knowledge by artificial intelligence.

Figure 4:
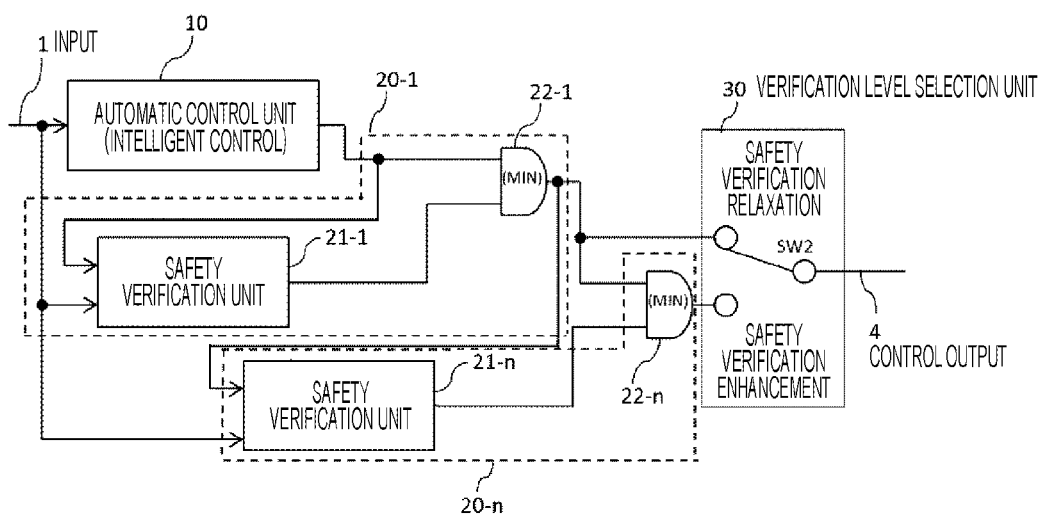
FIG. 4 is a diagram illustrating a configuration example in which the automatic control unit and the safety verification control unit illustrated in FIG. 2 are applied to the control system illustrated in FIG. 1.

FIG. 4 is a diagram illustrating a configuration example in which the automatic control unit 10 and the safety verification control unit 20 illustrated in FIG. 2 are applied to the control system illustrated in FIG. 1.

As illustrated in FIG. 4, in the present configuration example, the safety verification control unit including a plurality of safety verification units 21-1 to 21-n and AND gates 22-1 to 22-n is configured to verify the safety of the control output at a plurality of verification levels by connecting a plurality of safety verification control units 20-1 to 20-n in multiple stages. The verification level selection unit 30 controls a switch SW2 in accordance with the state related to the normality of the automatic control unit 10 (state in which safety verification should be relaxed or state in which safety verification should be enhanced), thereby selecting the safety limit output to be output from any of the AND gates 22-1 to 22-n and outputting the selected safety limit output as the control output 4. Thus, the verification level selection unit 30 causes the safety verification control unit 20 to verify the safety of the control output at a verification level corresponding to the state related to the normality of the automatic control unit 10.

If the same determination logic is implemented as the safety verification control units 20-1 to 20-n connected in multiple stages, the safety verification control units 20-1 to 20-n function as a redundant system, and even if any of them fails, the function of limiting the control output 4 for safety can be ensured. In addition, when different determination logics are implemented in the safety verification control units 20-1 to 20-n, it is possible to prevent a detection omission depending on the determination logic due to the effect of design diversification. In particular, by implementing determination logic based on artificial intelligence such as deep learning in at least one of the safety verification control units 20-1 to 20-n and determination logic based on rules in at least one of them, it is possible to make both detection of abnormality (dangerous event) beyond human knowledge by artificial intelligence and accountability based on solid rules compatible.

Figure 5:
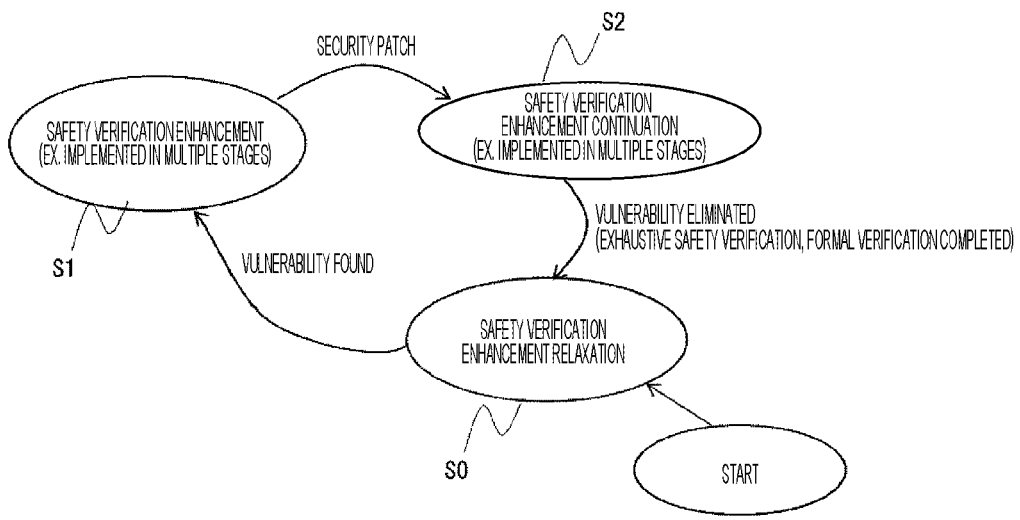
FIG. 5 is a diagram illustrating an embodiment of a state transition in the control system illustrated in FIGS. 1 to 4.

FIG. 5 is a diagram illustrating an embodiment of a state transition in the control system illustrated in FIGS. 1 to 4.

As illustrated in FIG. 5, the control system illustrated in FIGS. 1 to 4 is in a safety verification relaxation state S0, which is the first verification level, in the initial state, and if the vulnerability is found in the automatic control unit 10, the control system transitions to a safety verification enhancement state S1, which is the second verification level where the safety verification is enhanced in order to detect the malfunction due to the vulnerability. After a security patch is implemented to the automatic control unit 10 for eliminating the vulnerability, the control system transitions to a safety verification enhancement continuation state S2, which is the third verification level where the enhancement of the safety verification is continued for detecting a malfunction caused by a bug in the security patch. Then, after the vulnerability is eliminated by exhaustively completing the safety verification for the automatic control unit 10 to which the security patch has been implemented or by completing a formal verification by an algebraic simulation, the control system returns to the safety verification relaxation state S0. The safety verification enhancement state S1, which is the second verification level, and the safety verification enhancement continuation state S2, which is the third verification level, may be common.

The safety verification control unit 20 is configured to verify the safety of the control output 4 at a verification level corresponding to the safety verification relaxation state S0, the safety verification enhancement state S1, and the safety verification enhancement continuation state S2, and the verification level selection unit 30 causes the safety verification control unit 20 to verify the safety of the control output 4 at a verification level corresponding to the safety verification relaxation state S0, the safety verification enhancement state S1, and the safety verification enhancement continuation state S2.

This allows the safety of the control output 4 to be verified on the basis of the state related to the normality of the automatic control unit 10.

An event in which a vulnerability has been found is conceivable to be a case in which the control system itself detects a server attack and a vulnerability to the server attack from an abnormal operation detected by the safety verification function, or a case in which a management center that manages a plurality of control systems is provided and the event of vulnerability finding is notified from the management center via a communication path. In the latter case, the management center detects the server attack and the vulnerability to the server attack from malfunction information from the plurality of control systems managed by the management center.

Figure 6:
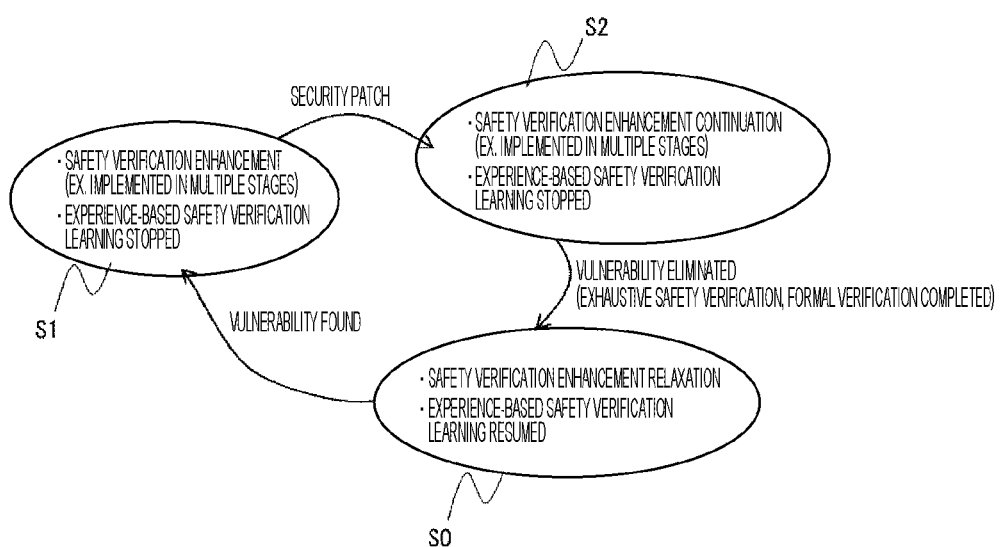
FIG. 6 is a diagram illustrating an embodiment of a state transition when experience-based safety verification is also learned online in the control system illustrated in FIGS. 1 to 4.

FIG. 6 is a diagram illustrating an embodiment of a state transition when experience-based safety verification is also learned online in the control system illustrated in FIGS. 1 to 4.

It is also conceivable that the control system illustrated in FIGS. 1 to 4 is configured to have a learning unit that learns a verification method of the safety of the control output in the safety verification control unit 20.

In this case, as illustrated in FIG. 6, the learning unit starts experience-based safety verification learning in the safety verification relaxation state S0, which is the initial state that is the normal verification state, and stops the experience-based safety verification learning to prevent erroneous learning due to vulnerability in the safety verification enhancement state S1. In the safety verification enhancement continuation state S2, measures against the vulnerability have been taken by the security patch, but the security patch has not been verified, and hence the experience-based safety verification learning is left stopped in order to prevent erroneous learning due to the bug in the security patch. Thereafter, the experience-based safety verification learning is resumed because the security patch for the vulnerability measures has been verified in the safety verification relaxation state S0.

This can prevent erroneous learning due to vulnerability or the like when the learning unit learns the verification method in the safety verification control unit 20.

An actual operation of the control system described above will be described below.

FIGS. 7 to 11 are views for explaining an operation example of the control system illustrated in FIGS. 1 to 4. Each operation example assumes that a vulnerability is found at time t1, the control system transitions to the safety verification enhancement state S1, then transitions to the safety verification enhancement continuation state S2 after the security patch is implemented at time t2, and the control system returns to the safety verification enhancement relaxation state S0 when the security patch verification is completed at time t3. The operation of the control system when the safety verification is enhanced according to the present embodiment is indicated by a solid line, and the operation of the control system when the safety verification is not enhanced is indicated by a broken line.

Figure 7:
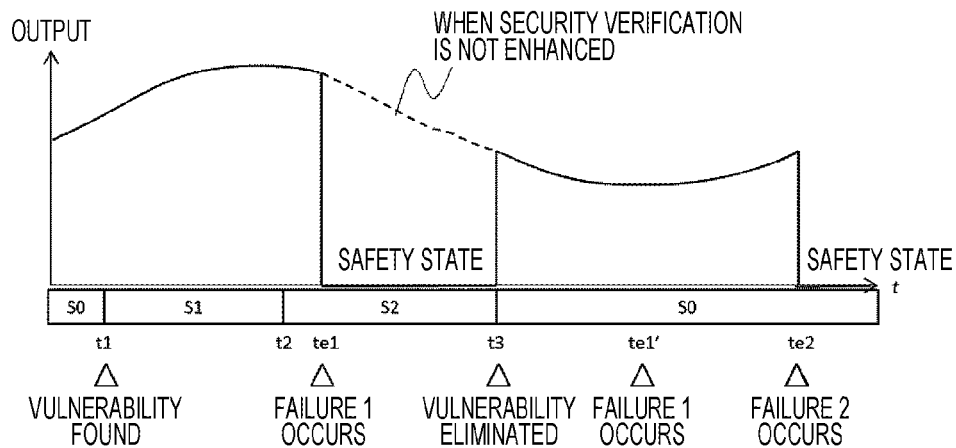
FIG. 7 is a view for explaining an operation example of the control system illustrated in FIGS. 1 to 4.

As illustrated in FIG. 7, when a failure 1 that the system can allow occurs in te1 and te1' and a failure 2 that the system cannot allow occurs in te2, if the safety verification has been enhanced, the control operation is stopped at te1 by the control output 4 just in case to bring the output into a safe state. Here, the output of the safe state depends on the purpose of use of the system, and in railway control for example, the safe state can be maintained by turning off the power and applying a brake. In an automobile, as represented by autonomous driving, the automobile slows to a stop by applying a slow brake, or a human operation gives increased priority to human override or explicitly switches to human override.

Figure 8:
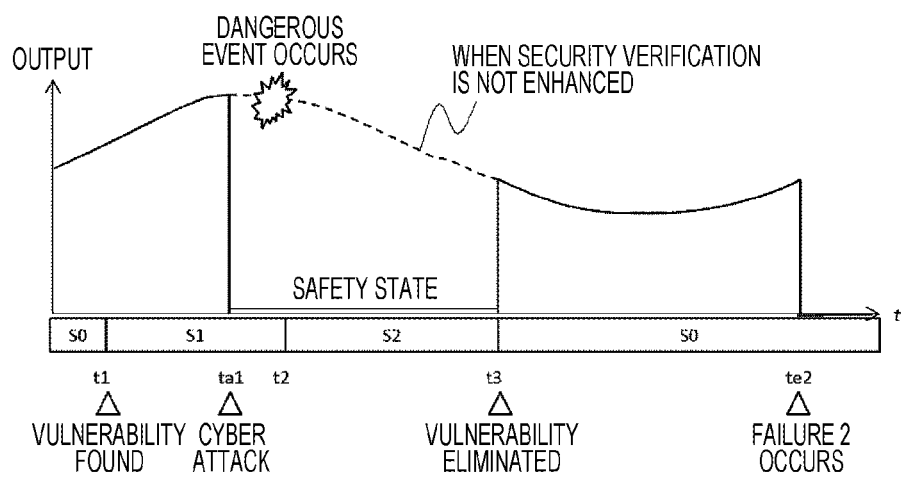
FIG. 8 is a view for explaining an operation example of the control system illustrated in FIGS. 1 to 4.

On the other hand, if the safety verification has not been enhanced, the control output 4 can continue to output as indicated by the broken line, but if a cyber attack is received, as illustrated in FIG. 8, there is a risk of a dangerous event occurrence because the safety verification has not been enhanced. That is, the verification level selection unit 30 manages the state related to the normality of the automatic control unit 10 on the basis of the vulnerability of the automatic control unit 10 against the cyber attack.

If the failure 2 that the system cannot allow occurs in the time te2, an abnormality is detected by a normal (relaxed) safety verification, and the control operation is stopped to bring the output into a safe state.

As illustrated in FIG. 8, when there is a cyber attack at time ta1 before the time t2 at which the security patch is implemented, if the safety verification has been enhanced, it is possible to detect the abnormality and stop the control operation by the control output 4 to bring the output into a safe state, but if the safety verification has not been enhanced, the abnormality cannot be detected and a dangerous event occurs.

Figure 9:
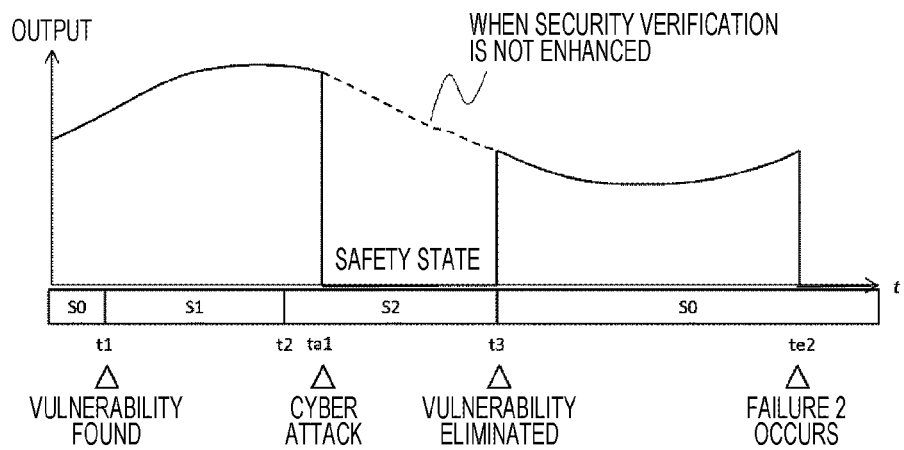
FIG. 9 is a view for explaining an operation example of the control system illustrated in FIGS. 1 to 4.

As illustrated in FIG. 9, when there is a cyber attack at time ta1 after the time t2 at which the security patch is implemented, there is no influence of the cyber attack, and hence a dangerous event does not occur, but the safety is ensured by stopping the operation just in case.

Figure 10:
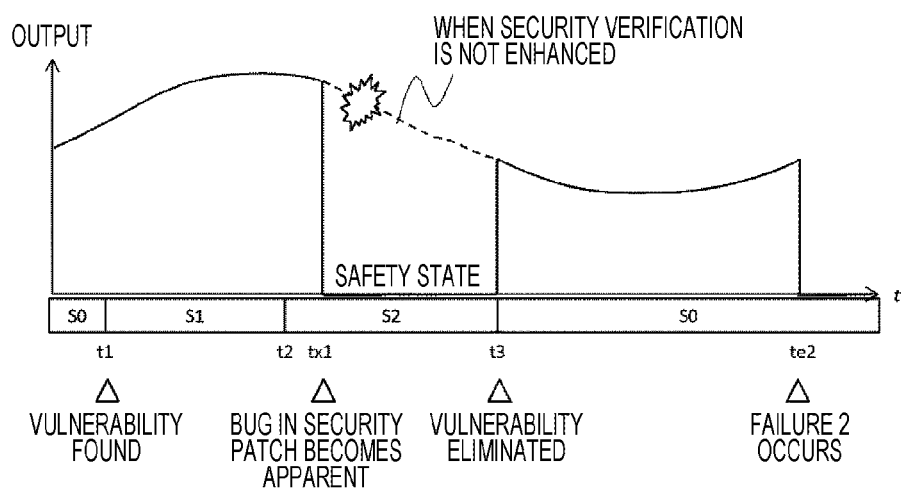
FIG. 10 is a view for explaining an operation example of the control system illustrated in FIGS. 1 to 4.

As illustrated in FIG. 10, when a bug in the security patch becomes apparent at time tx1, if the safety verification has been enhanced, it is possible to detect the abnormality and stop the control operation by the control output 4 to bring the output into a safe state, but if the safety verification has not been enhanced, the abnormality cannot be detected and a dangerous event occurs.

Figure 11:
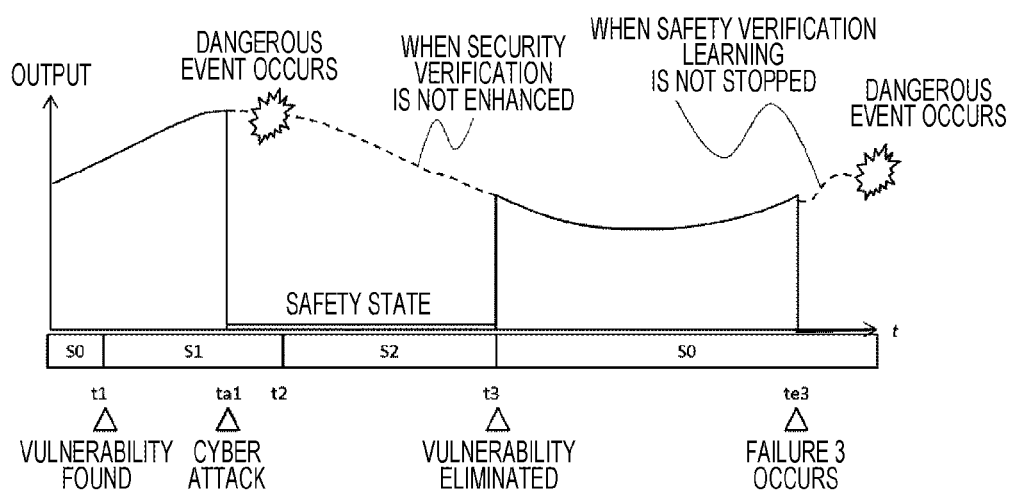
FIG. 11 is a view for explaining an operation example of the control system illustrated in FIGS. 1 to 4.

In FIG. 11, the solid line indicates the operation of the system in the case where the safety verification is enhanced in the safety verification enhancement state S1i and the safety verification enhancement continuation state S2 and the learning of the experience-based safety verification is stopped, and the broken line indicates the operation of the system in the case where the safety verification is not enhanced and the learning of the experience-based safety verification is not stopped.

The present example assumes that a failure 3 occurring at time te3 causes the same dangerous event as that occurred as a result of the cyber attack at the time ta1. According to the present example, if the safety verification is enhanced at the time of occurrence of the cyber attack at the time ta1 and the learning of the experience-based safety verification is stopped, it is possible to bring the output into the safe state without missing the dangerous event occurred as a result of the cyber attack, and the occurrence of the dangerous event because the failure 3 occurred at the time te3 is judged to be normal and the output is continued can be prevented.

On the other hand, if the safety verification is not enhanced at the time of occurrence of the cyber attack at the time ta1 and the learning of the experience-based safety verification is not stopped, the experience-based safety verification function learns the dangerous event occurred as a result of the cyber attack at the time ta1 as a normal result, and the dangerous event occurs because the failure 3 occurred at the time te3 is judged to be normal and the output is continued.

In the present embodiment, since the safety processing is executed in accordance with the state of the automatic control unit 10, it is possible to realize the normal control of the control device and the safety operation of the control target.

Second Embodiment

Figure 12:
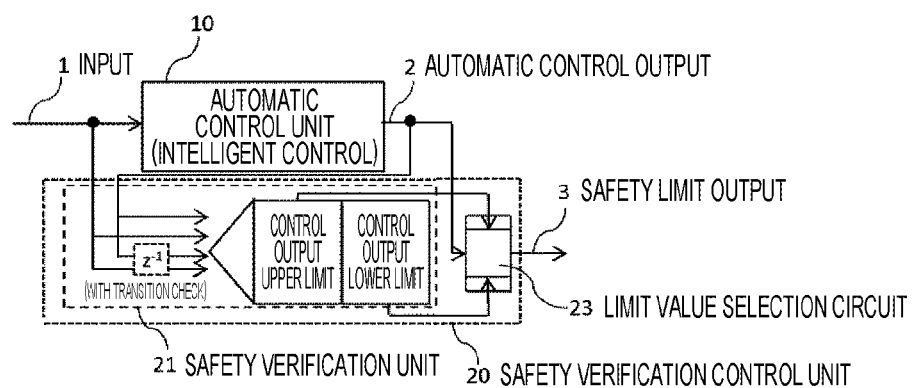
FIG. 12 is a block diagram illustrating a second embodiment of the automatic control unit and the safety verification control unit illustrated in FIG. 1.

FIG. 12 is a block diagram of the automatic control unit 10 and the safety verification control unit 20 according to the second embodiment.

As illustrated in FIG. 12, in the present embodiment, the configuration of the safety verification control unit is different from that illustrated in FIG. 2. The safety verification control unit 20 in the present embodiment includes the safety verification unit 21 and a limit value selection circuit 23.

The safety verification unit 21 has a control output upper limit, which is an allowable upper limit value of the control output 4, and a control output lower limit, which is a lower limit value of the control output 4, and receives the input 1 to the automatic control unit 10 and the automatic control output 2 having been output from the automatic control unit 10, and outputs the control output upper limit and the control output lower limit corresponding to the input 1 and the automatic control output 2. In the case where the state transition from the past value is also focused (with transition checked), the safety verification unit 21 also receives the input 1 and the automatic control output 2 of the past before one sample ($z^{-1}$), and outputs the control output upper limit and the control output lower limit corresponding thereto.

The limit value selection circuit 23 outputs the automatic control output 2 when the automatic control output 2 having been input as the safety limit output 3 is between the control output upper limit and the control output lower limit, outputs a value limited to the control output upper limit or less when the automatic control output 2 having been input exceeds the control output upper limit, and outputs a value limited to the control output lower limit or more as the safety limit output 3 that becomes the control output 4 when the automatic control output 2 having been input falls below the control output lower limit.

This allows the safety limit output 3 inside a range between the control output upper limit and the control output lower limit to be output even when the automatic control output 2 having been output from the automatic control unit 10 is outside the range between the allowable control output upper limit and the control output lower limit of the control output 4.

Furthermore, the safety verification unit 21 outputs a safety verification result of the automatic control output 2 as a status. The status assumes three values: OK if inside the range of the control output lower limit and the control output upper limit, OK w/limit if outside the range of the control output lower limit and the control output upper limit but there is a value between the control output lower limit and the control output upper limit, i.e., if the control output lower limit<the control output upper limit is true, and NG if there is no value between the control output lower limit and the control output upper limit, i.e., if the control output lower limit<the control output upper limit is not true.

Figure 13:
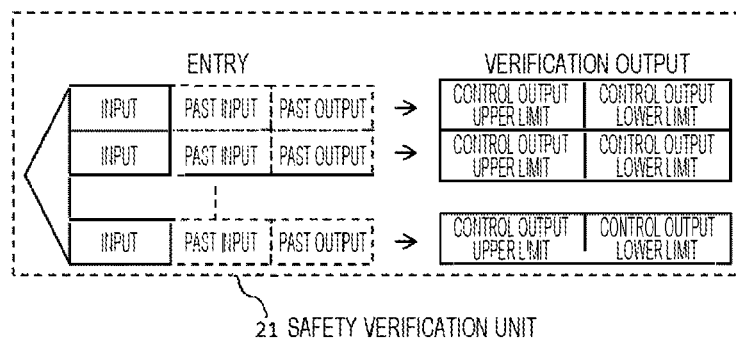
FIG. 13 is a diagram illustrating a configuration example of a memory equivalent to an operation of the safety verification unit illustrated in FIG. 12.

FIG. 13 is a diagram illustrating a configuration example of a memory equivalent to an operation of the safety verification unit 21 illustrated in FIG. 12.

As illustrated in FIG. 13, the operation of the safety verification unit 21 illustrated in FIG. 12 is equivalent to a content addressable memory (CAM), and the control output upper limit and the control output lower limit corresponding to the input 1 and the automatic control output 2 and, in the case of being with the transition check, the combination of the past input 1 and the automatic control output 2 is output as an entry.

Figure 14:
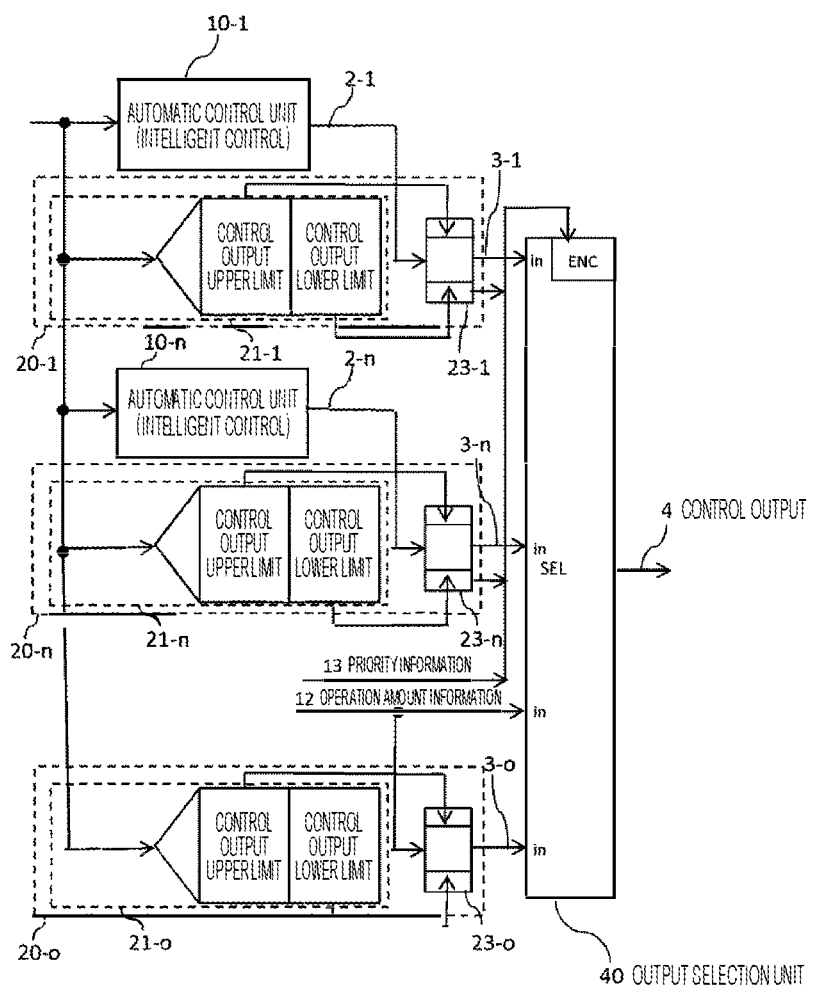
FIG. 14 is a diagram illustrating a configuration example of a control system using the automatic control unit and the safety verification control unit illustrated in FIG. 12.

FIG. 14 is a diagram illustrating a configuration example of a control system using the automatic control unit 10 and the safety verification control unit 20 illustrated in FIG. 12.

As illustrated in FIG. 14, the present configuration example redundantly has a plurality of verification units including the automatic control unit 10 and the safety verification control unit 20 illustrated in FIG. 12, and is provided with an output selection unit 40 as a verification level selection unit. The plurality of verification units verify the safety of the control output 4 to be output from the automatic control units 10-1 to 10-n constituting the respective verification units, and on the basis of the verification result, controls the control output. The output selection unit 40 selects one of safety limit outputs 3-1 to 3-n to be output from limit value selection circuits 23-1 to 23-n and outputs it as the control output 4 in accordance with the state related to the normality of the automatic control units 10-1 to 10-n on the basis of the status from the limit selection circuits 23-1 to 23-n. Furthermore, the output selection unit 40 is given operation amount information 12 serving as a control output by a human operation input and priority information 13 indicating the priority of the human operation input, and when the priority information 13 indicates that the human operation input is given priority over the automatic control units 10-1 to 10-n, the output selection unit 40 outputs the control output 4 by a safety limit output 3-o to be output from a limit value selection circuit 23-o in accordance with the human operation amount information 12. At this time, for example, in the case where the safety limit output 3-o corresponding to the human operation amount information 12 becomes outside a predetermined range, performing control such as increasing the reaction force allows the fact that the human has operated to be recognized when the human has operated.

By redundantly having the plurality of verification units in this manner, the function of limiting the control output 4 for safety can be secured even if any of the plurality of verification units fails. Furthermore, it is possible to preferentially output the control output 4 corresponding to the human operation amount information 12.

FIG. 15 is a view presenting an example of an output selection method of the control output 4 when the control system illustrated in FIG. 14 is in a safety verification enhancement relaxation state S0, and FIG. 16 is a view presenting an example of an output selection method of the control output 4 when the control system illustrated in FIG. is in a safety verification enhancement state Si or a safety verification enhancement continuation state S2.

When the statuses of the automatic control units 10-1 to 10-n are the same, the output selection unit 40 sets the priority order selected for realization as the automatic control unit 10-1>the automatic control unit 10-n. As a result, in the example illustrated in FIG. 15, Case 1: an automatic control output 2-1 is selected if the status of the automatic control unit 10-1 is OK. Case 2: An automatic control output 2-2 is selected if the status of the automatic control unit 10-1 is NG and the status of the automatic control unit 10-2 is OK. Case 3: An automatic control output 2-n is selected if the statuses of the automatic control units 10-1 to 10-(n-1) are NG and the status of the automatic control unit 10-n is OK. Case 4 and Case 5: The automatic control output 2-1 is selected with its output limited if the status of the automatic control unit 10-1 is OK/w limit and the statuses of the other automatic control units are other than OK (OK/w limit or NG). Case 6 and Case 7: The automatic control output 2-2 is selected with its output limited if the status of the automatic control unit 10-1 is NG, the status of the automatic control unit 10-2 is OK/w limit, and the statuses of the other automatic control units are other than OK (OK/w limit or NG). Case 8: The automatic control output 2-n is selected with its output limited if the statuses of the automatic control units 10-1 to 10-(n-1) are NG and the status of the automatic control unit 10-n is OK/w limit. Case 9: The output is stopped if the statuses of the automatic control units 10-1 to 10-n are NG. Case 10: The operation amount information 12 of the override is selected if the priority information 13 of the override by the human operation is 1 and the status of the override is OK. Case 11: The operation amount information 12 of the override is selected with its output limited if the priority information 13 of the override is 1 and the status of the override is OK/w limit. Case 12: The operation amount information 12 of the override is selected without its output limited if the priority information 13 of the override is 2.

In the example illustrated in FIG. 16, since the safety verification is enhanced, Case 4-7: the output is stopped without selecting the automatic control output whose status is OK/w limit.

In the control system illustrated in FIG. 14, the automatic control units 10-1 to 10-n are provided with a single safety verification control unit 20-1 to 20-n, respectively. However, as illustrated in FIG. 4, in the case where the single automatic control unit 10 is provided with the plurality of safety verification control units 20-1 to 20-n in a multiplex manner, it is conceivable a configuration in which the output is stopped when any of the multiplexed safety verification functions has the status of NG, or a configuration in which the safety limit output 3 is output on the basis of the verification result in the safety verification control unit 20 that is low in probability of an event that is falsely judged to be false-negative even if the safety verification control unit 20 that is high in probability of false-negative has the status of NG as long as the safety verification control unit 20 that is low in probability of a false-negative (an event that is falsely judged to be abnormal (dangerous) despite being normal) has the status of OK or OK/w limit.

Figure 17:
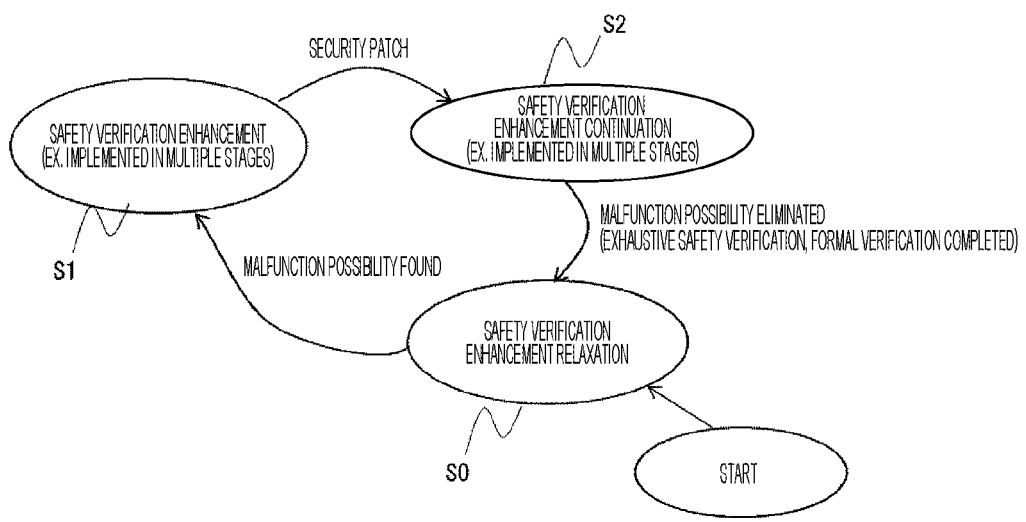
FIG. 17 is a diagram illustrating an embodiment of a state transition in a case where malfunction possibility finding is a trigger.
Figure 18:
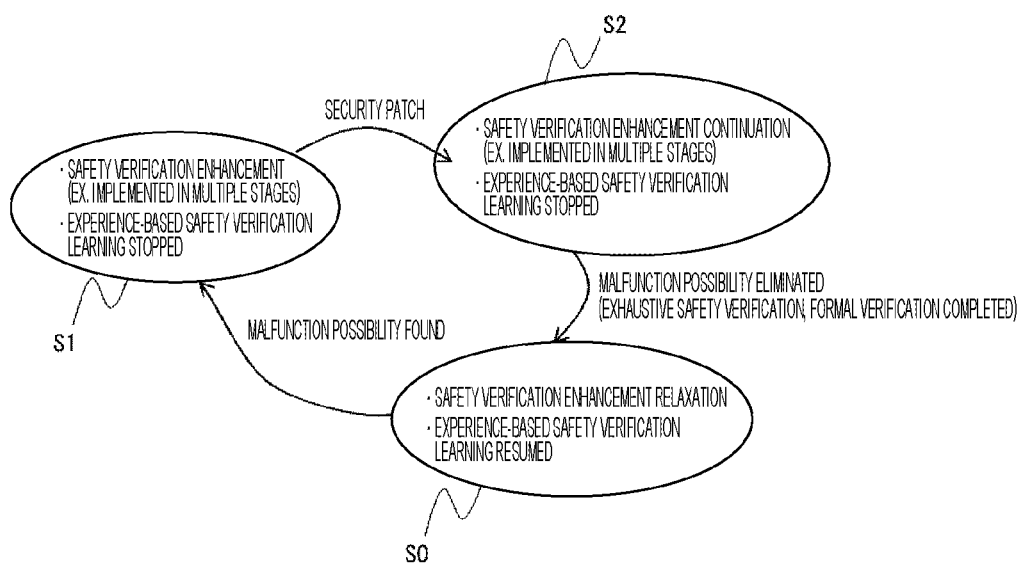
FIG. 18 is a diagram illustrating an embodiment of a state transition when experience-based safety verification is also learned online in the state transition illustrated in FIG. 17.

FIG. 17 is a diagram illustrating an example of a state transition in a case where malfunction possibility finding is a trigger, in the control system according to the second embodiment. FIG. 18 is a diagram illustrating an embodiment of a state transition when experience-based safety verification is also learned online in the state transition illustrated in FIG. 17.

In the above-described control system, as illustrated in FIGS. 17 and 18, it is also conceivable to cause the state to transition with an event of malfunction possibility finding as a trigger. The malfunction possibility finding includes an event of finding of a failure part after the start of operation, in addition to finding of vulnerability. That is, it is conceivable that the verification level selection unit 30 manages the state related to the normality of the automatic control unit 10 on the basis of the malfunction cause inherent in the hardware or software of the automatic control unit 10.

Similarly to vulnerability finding, the event of malfunction possibility finding is conceivable to be a case in which the control system itself detects malfunction possibility finding from an abnormal operation detected by the safety verification control unit, and a case in which a management center that manages a plurality of control systems is provided and the event of malfunction possibility finding is notified from the center via a communication path. In the latter case, the management center detects the malfunction possibility finding from malfunction information from the plurality of control systems managed by the management center.

The above-described embodiments are exemplary and the present invention is not limited thereto. Various additions, modifications, and the like can be made by those skilled in the art within the scope of the present invention. For example, the embodiments can be combined as appropriate. The configurations described in any of the embodiments can be combined in addition to the explicitly described combinations.

REFERENCE SIGNS LIST

1 input
2 automatic control output
3 safety limit output
4 control output
10 automatic control unit
20 safety verification control unit
21 safety verification unit
22 AND gate
23 limit value selection circuit
30 verification level selection unit
40 output selection unit

The invention claimed is:

1. A control system, comprising:
an automatic control unit that generates a control output that is output to a control target in response to a predetermined input;
a safety verification control unit configured to verify safety of the control output at a plurality of verification levels; and
a verification level selection unit that manages a state related to normality of the automatic control unit and selects a verification level of safety of the control output in the safety verification control unit in accordance with the state.

2. The control system according to claim 1, wherein
the safety verification control unit is configured to output the control output controlled based on a verification result at each of the plurality of verification levels, and
the verification level selection unit selects any of the control outputs to be output from the safety verification control unit and outputs the control output to the control target in accordance with the state related to normality of the automatic control unit.

3. The control system according to claim 1, wherein
the safety verification control unit is configured to verify safety of the control output at any of a first verification level, a second verification level with verification enhanced more than the first verification level, and a third verification level with verification enhanced equal to or more than the second verification level, and
the verification level selection unit selects the first verification level as a normal verification state when the automatic control unit is capable of normal control, selects the second verification level as a verification enhancement state when vulnerability of the automatic control unit has been found in the normal verification state, selects the third verification level as a verification enhancement continuation state when measures against the vulnerability have been taken in the verification enhancement state, and selects the first verification level as the normal verification state when normal control of the automatic control unit after the measures having been taken is confirmed in the verification enhancement continuation state.

4. The control system according to claim 2, wherein the safety verification control unit outputs the control output to the control target when the verification result indicates the safety of the control output, and stops outputting the control output to the control target when the verification result fails to indicate the safety of the control output.

5. The control system according to claim 2, wherein the safety verification control unit has an allowable upper limit value and a lower limit value of the control output, and outputs a control output limited to the upper limit value or less to the control target when the control output exceeds the upper limit value in the verification result, and outputs a control output limited to the lower limit value or more to the control target when the control output falls below the lower limit value in the verification result.

6. The control system according to claim 2, wherein the safety verification control unit is configured to verify safety of the control output at a plurality of verification levels by being connected in multiple stages.

7. The control system according to claim 2, comprising a plurality of the automatic control units, wherein
the safety verification control unit includes a plurality of verification units that verify safety of the control output at verification levels different from one another and control the control output based on a verification result, and
the verification level selection unit selects any of the control outputs from the plurality of verification units and outputs the control output to the control target in accordance with the state related to normality of the automatic control unit.

8. The control system according to claim 7, wherein the verification level selection unit is an output selection unit that is given the control output by a human operation input and priority information indicating priority of the human operation input, and when the priority information indicates that the human operation input is given priority over the automatic control unit, the output selection unit outputs the control output by the human operation input to the control target.

9. The control system according to claim 3, wherein the second verification level and the third verification level are the same.

10. The control system according to claim 3, comprising a learning unit that learns a verification method of safety of the control output in the safety verification control unit, wherein
the learning unit performs learning of the verification method in the normal verification state, and stops learning of the verification method in the verification enhancement state and the verification enhancement continuation state.

11. The control system according to claim 1, wherein the verification level selection unit manages the state related to normality of the automatic control unit based on vulnerability of the automatic control unit against a cyber attack.

12. The control system according to claim 1, wherein the verification level selection unit manages the state related to normality of the automatic control unit based on a malfunction cause inherent in hardware or software of the automatic control unit.

* * * * *